Sept. 30, 1952     A. P. GUBRUD     2,611,972
GRADUATED LEVEL
Filed Feb. 1, 1950
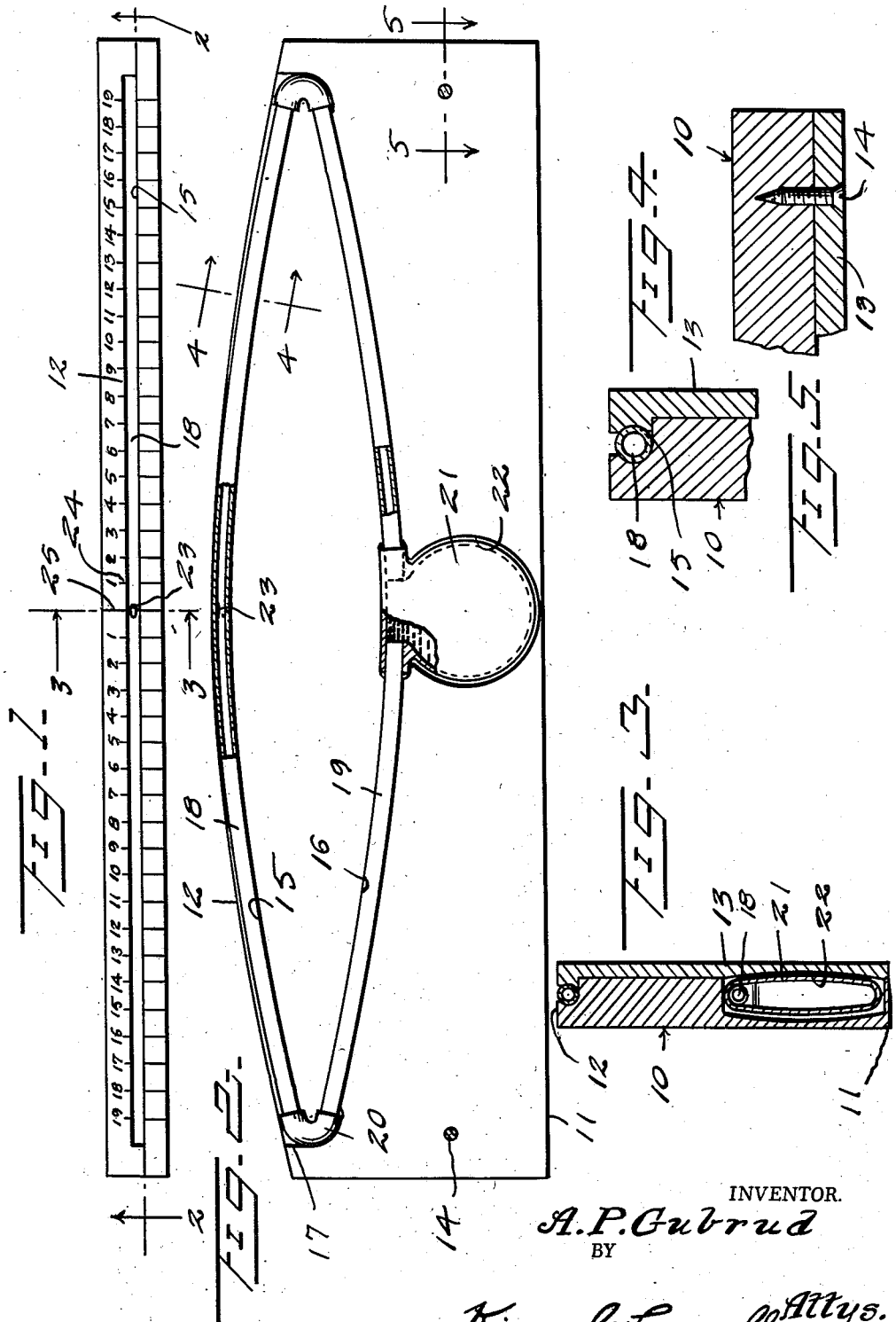
INVENTOR.
A. P. Gubrud
BY
Kimmel & Crowell Attys.

Patented Sept. 30, 1952

2,611,972

UNITED STATES PATENT OFFICE 2,611,972

GRADUATED LEVEL

Adolph P. Gubrud, Hudson, S. Dak.

Application February 1, 1950, Serial No. 141,742

1 Claim. (Cl. 33—211)

This invention relates to spirit levels.

An object of this invention is to provide a spirit level embodying a closed circulating path for the liquid contained therein, and means in the path whereby expansion or contraction of the liquid will not affect the operation of the device.

Another object of this invention is to provide a spirit level in which the expansion or contraction of the liquid therein will have no effect on the size of the bubble.

A further object of this invention is to provide a spirit level which includes graduations along the path of the bubble so that the degree of variation from the horizontal can be readily determined.

With the above and other objects in view, my invention consists in the arrangement, combination and details of construction disclosed in the drawings and specification, and then more particularly pointed out in the appended claim.

In the drawing:

Figure 1 is a plan view of a spirit level constructed according to an embodiment of this invention.

Figure 2 is a sectional view partly broken away taken substantially on the line 2—2 of Figure 1.

Figure 3 is a sectional view taken on the line 3—3 of Figure 1.

Figure 4 is a fragmentary sectional view taken on the line 4—4 of Figure 1.

Figure 5 is a fragmentary sectional view taken on the line 5—5 of Figure 1.

Referring to the drawing, the numeral 10 designates generally an elongated flat body formed with a horizontally disposed lower side 11 and a convex upper side 12. The body 10 includes a plate 13 which is secured in face abutting relation thereto by fastening members 14. One side of the body 10 is formed with an upper longitudinally curved channel 15 and a lower oppositely curved channel 16. The two channels 15 and 16 are connected together at their opposite ends by end channels 17. A longitudinally bent glass tube 18 is seated in the upper channel 15, and a lower longitudinally bent tube 19 is seated in the lower channel 16. The two tubes 18 and 19 are connected together at the opposite ends thereof by connecting members 20 and are filled with a suitable expansible liquid, such as glycerine thinned by alcohol except for an air bubble 23.

Lower tube 19 is divided at a central point and its ends extend into receiving tubes 21 which comprise part of a thermo-responsive wafer-shaped metal housing or reservoir which expands or contracts in accordance with temperature changes. Housing 21 is loosely seated in a circular opening in body 10, the relatively loose seating permitting housing 21 to expand or contract under temperature variations coincidentally with the level liquid so as to prevent exploding of the glass tube 18 and to provide for the maintaining of a single bubble 23 within the tube 18. By providing the lower tube 19 in an upward curvature and the upper tube 18 in a downward or convex curvature in the event the level is turned over with the straight lower edge 11 uppermost, the bubble will pass along the length of the tube 18 and may enter the lower tube 19 through one of the connecting members 20.

When the level is lying with the tube 18 uppermost the bubble will return to the upper tube 18 passing along the length of the lower tube 19 and then moving through one of the connectors 20 into the upper tube 18. The convex upper side 12 of the body 10 is formed with oppositely extending graduations 24 which extend from a center indication 25. The graduations 24 are provided so that the user of the level will be able to determine from the position of the bubble 23 the exact grade or inclination of the part with which the level is engaged. The metal wall construction of the wafer shaped thermo-responsive housing 21 is of a heat responsive characteristic substantially the same as the expansion or contraction factor of the liquid within the housing 21 and within the two tubes 18 and 19. In this manner when the liquid is subjected to relatively high heat, housing 21 will expand proportionate to the increase in temperature, thereby providing additional reservoir capacity for the expanded liquid. In like manner, if the device is subjected to cold which would contract the liquid, housing 21 will also contract in proportion to the temperature of the atmosphere and the contraction factor of the liquid.

What is claimed is:

A spirit level comprising an elongated body formed with upper and lower longitudinally curved channels connected together at the opposite ends thereof, said body having a circular recess communicating with said lower channel, upper and lower longitudinally curved tubes connected together at the ends thereof and seating in said channels, and a thermo-responsive metal housing of wafer shape interposed in said lower tube and loosely seating in said recess, said housing expanding or contracting with expansion or contraction of liquid in said tubes.

ADOLPH P. GUBRUD.

REFERENCES CITED

The following references are of record in the file of this patent:

UNITED STATES PATENTS

| Number | Name | Date |
|---|---|---|
| 1,669,035 | Belfield | May 8, 1928 |
| 1,922,997 | Widner | Aug. 15, 1933 |
| 2,019,178 | Elsom | Oct. 29, 1935 |
| 2,059,551 | Christensen | Nov. 3, 1936 |
| 2,221,912 | Diggins | Nov. 19, 1940 |
| 2,389,664 | Giannini | Nov. 27, 1945 |

FOREIGN PATENTS

| Number | Country | Date |
|---|---|---|
| 28,734 | Great Britain | of 1910 |
| 300,826 | Germany | 1917 |
| 354,998 | France | 1905 |